United States Patent [19]

Simmons

[11] Patent Number: 4,955,572  
[45] Date of Patent: Sep. 11, 1990

[54] SPORTS BOTTLE SUPPORTING DEVICE

[76] Inventor: Norman Simmons, 10 Notch Ct., Dix Hills, N.Y. 11746

[21] Appl. No.: 366,440

[22] Filed: Jun. 15, 1989

[51] Int. Cl.⁵ .............................................. A47F 1/00
[52] U.S. Cl. .................................... 248/312; 248/683
[58] Field of Search ...................... 248/312.1, 313, 690, 248/692, 103, 108, 205.3, 213.2, 220.2, 224.4, 225.2, 227, 301, 304, 309.1, 315, 339, 340, 683; 24/3 L, 3 H, 11 HC

[56] References Cited

U.S. PATENT DOCUMENTS

| | | | |
|---|---|---|---|
| 285,645 | 9/1883 | Milligan | 248/690 |
| 365,555 | 6/1887 | Tolman | 248/315 |
| 2,035,749 | 3/1936 | Knauss | 248/108 |
| 2,628,054 | 2/1953 | Fazakerley | 248/300 |
| 2,723,818 | 11/1955 | Hurtzig | 248/315 |
| 3,076,627 | 2/1963 | Huron | 248/300 |
| 3,101,869 | 8/1963 | Baker | 248/312 |
| 3,304,039 | 2/1967 | Edelman | 248/108 |
| 3,424,421 | 1/1969 | Kalbow | 248/312 |
| 3,908,948 | 9/1975 | Hawthorne | 248/312 |
| 4,452,354 | 6/1984 | Tabachnick | 248/205.3 |

FOREIGN PATENT DOCUMENTS 2447907  4/1976  Fed. Rep. of Germany ... 248/205.3

*Primary Examiner*—Ramon O. Ramirez
*Assistant Examiner*—Robert A. Olson
*Attorney, Agent, or Firm*—Victor M. Serby

[57] ABSTRACT

The present invention is a supporting device for sports bottles having a liquid container with an integral neck and a cap which fits on the neck to hold the sports bottle in a vertical position. The supporting device is an integrally formed manufacture having a retaining section with a hole to fit over the neck of the container and is secured against vertical movement when the sports bottle cap is screwed down. Integral with the supporting device is a mounting tab which extends downward toward the container's base at or near the side of the sports bottle container when the supporting device is secured on the sports bottle. The bottle can now be hung by placing the mounting tab over one's belt to free his hands while he is walking. Additionally, by adhering a receiving block, having a hole which accepts the mounting tab, in a convenient location within a car a sports bottle can be hung within a car within easy reach of the user.

5 Claims, 1 Drawing Sheet

SPORTS BOTTLE SUPPORTING DEVICE

BACKGROUND OF INVENTION

This invention is concerned with mounting devices for drinking containers, specifically sports bottles, which secure the containers in an upright position when not in use.

Devices that hold liquid drink containers in an upright position are well known in the art. Sports bottle holders found on racing bicycles cradle the sports bottle to secure it to the bicycle frame but they are expensive and have only one application; travel mugs attach to a mounting base which is secured to a car's dashboard by an adhesive; and canteens fit into pouches which have a belt loop to hang the canteen from one's belt while he is walking. It is also well known in the art to have devices secured around the neck of a liquid drink container such as a carrying handle for a milk bottle, a cap retainer on the neck of a canteen to prevent loss of the cap, or product literature secured under the cap.

Sports bottles are becoming increasingly popular as a container for serving take out beverages at fast food restaurants and convenience stores. They are a no-spill alternative to cups and can be easily used in a car or while walking. Furthermore, they can be rinsed out and reused as a portable beverage container. The problem is that no inexpensive device currently exists to secure the sports bottle in an upright position in a car or on one's person to free the user's hands while he is not drinking from the bottle. Such a device will increase the utility of sports bottles and therefore increase their use.

SUMMARY OF INVENTION

The present invention is a manufacture which secures a sports bottle in an upright position to free the user's hands when he is not drinking from the bottle while he is either in a motor vehicle or while he is walking. In accordance with a first embodiment of the invention, an integral sports bottle supporting member having a retaining section with a hole to accept a sports bottle neck and also having a mounting tab integral with the sports bottle supporting member is placed over the threaded neck of a sports bottle and is secured in place by screwing down the sports bottle cap. In this position, the member's mounting tab runs vertically downward the side of the sports bottle and is spaced close to the sports bottle container's side. In accordance with a second preferred embodiment of the invention, the sports bottle supporting member comprises an improved sports bottle cap and has an integrally molded mounting tab so that when the cap is screwed onto the sports bottle the mounting tab runs vertically downward the side of the sports bottle container and is spaced close to the sports bottle container's side. Using either preferred embodiment, the sports bottle can be secured in a vertical position by a pedestrian by slipping the mounting tab over his belt, pants waistband or in a pocket so that his hands are free. Alternatively, a motorist can adhere a mating receiving bracket in a convienient location inside his car to hang the sports bottle in a vertical position when it is not in use.

DESCRIPTION OF PREFERRED EMBODIMENT

Figure 1:
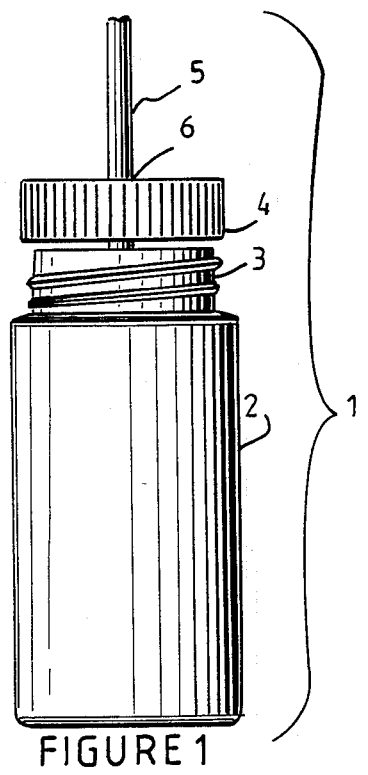
FIG. 1 is a conventional sports bottle.
Figure 2:
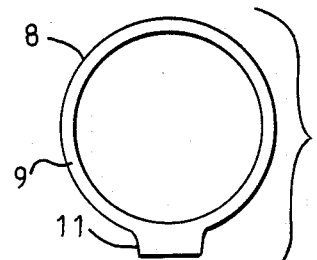
FIG. 2 is a top view of a first preferred embodiment of the invention.
Figure 4:
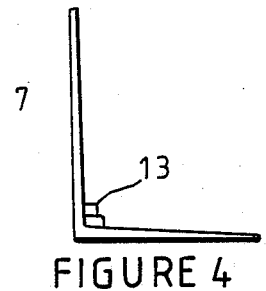
FIG. 4 is a side view of a first preferred embodiment of the invention.
Figure 3:
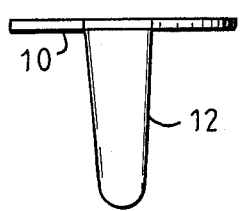
FIG. 3 is a front view of a first preferred embodiment of the invention.

FIG. 1 shows a type of a conventional sports bottle (1) comprising a cylindrical container (2) having an integrally formed threaded neck (3), a threaded cap (4) which screws onto the neck of the container and a straw (5) placed through a hole (6) in the top surface of the cap. The outer diameter of the container is greater than the outer diameter of the cap which is greater than the diameter of the threaded neck. This invention is equivalently applicable to other types of sports bottles including so called squeeze bottles or sports bottles having no provisions for a straw.

Figure 7:
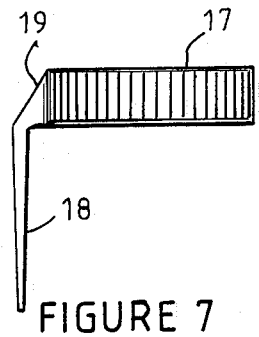
FIG. 7 shows an improved sports bottle cap having an integral mounting tab

Referring to FIGS. 2, 3, 4 and 5, an integrally formed sports bottle supporting member (7), preferably injection molded plastic fits over the neck (3) of a sports bottle container and is secured in place when the sports bottle cap (4) is screwed on. The flat annular retaining section (8) has an up surface (9) and a down surface (10) and a thickness which is less than or about equal to the clearance between the sports bottle cap (4) and the sports bottle container (2) when the cap (3) is screwed down all the way on the container. The inside diameter of the annular retaining section is larger than the base diameter of the neck of the sports bottle container but smaller than that of the outside diameter of the sports bottle cap. Preferably the inside diameter of the annular retaining section should be between the external thread diameter of the neck (3) and the base diameter of the neck to be easily captivated on the container neck and not fall off if the container (without cap) is inverted or shaken. Of course an equivalent non-circular hole in the retaining section can be provided to perform the same function in the same way as a circular hole. The outer diameter of the annular retaining section is larger than the diameter of the sports bottle cap to secure the sports bottle supporting member from lifting off the container neck, under load, when the cap is screwed onto the neck. The outer diameter of the annular retaining section is preferably smaller than the outside diameter of sports bottle container. An extension section (11) integral with the annular retaining section extends radially outward from the outside diameter of the annular retaining section to a radius about equal to, preferably about 3/16 inch larger than the outside diameter of the sports bottle container. This extension section is not necessary if the outside diameter of the retaining section is about equal to the outside diameter of the sports bottle container, but having a smaller retaining section diameter and an extension section saves material. An elongated mounting tab (12), integral with the extension section, extends downward from the outer edge of the extension section. It is preferable to include an integral spacer (13) in the sports bottle supporting member located on the inside surface of the mounting tab at or near the junction of the mounting tab and the extension section to keep the mounting tab spaced a fraction of an inch away from the container when the sports bottle mounting member is installed on a sports bottle (see FIG. 5). FIG. 7 shows a second preferred embodiment of the sports bottle supporting device which has a sports bottle cap (17) and an integral mounting tab (18). An extension section (19) integrally formed with the bottle cap (necessary when the outside cap diameter is less than the container diameter) extends radially outward from the outside of the sports bottle cap to a radius about equal to the outside diameter of the container. An elongated mounting tab (18), integral with the extension section, extends downward from the outer edge of the extension section. When the improved sports bottle cap is screwed onto a sports bottle container, the improved bottle cap's elongated mounting tab extends toward the base of a sports bottle container and is essentially parallel to the sports bottle's side. All the improvements of the mounting tab of the first embodiment such as the taper and the integral spacer can be incorporated in this embodiment as well.

Figure 6:
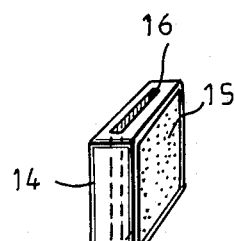
FIG. 6 shows a mating receiving bracket for a first preferred embodiment of the invention.

FIG. 6 shows a receiving bracket (14) backed with double stick tape (15) so that it can be adhered to a dashboard or other vertical surface. The receiving bracket contains a hole (16) or a mating cavity which will accept the mounting tab of the sports bottle supporting member. In the preferred embodiments the mounting tab of the sports bottle supporting member has a downward taper and the receiving cavity or hole mates the taper so that the sports bottle equipped with a supporting member will be easily inserted without fumbling and be self aligning in the receiving bracket when the receiving bracket is installed with the mating cavity facing upward.

Figure 5:
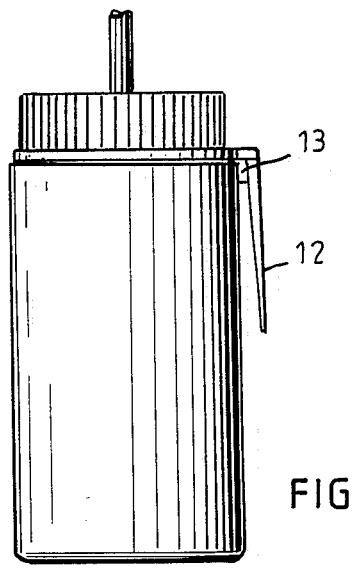
FIG. 5 shows a first preferred embodiment of the invention installed on a sports bottle.

When a sports bottle is equipped with a sports bottle supporting member as shown in FIG. 5, it can be attached to a pedestrian's belt, waistband or pocket by slipping the mounting tab behind the belt, waistband or outer edge of his pocket, thus freeing his hands. By adhering the mounting bracket of FIG. 6 in a car in a convienient location so the hole or cavity points in an upward direction, the sports bottle can be attached in a vertical position, so no one has to hold the beverage when he is not drinking it. If either the pedestrian or the motorist wishes to take a drink, he simply lifts the sports bottle takes a sip and rehangs the sports bottle.

Those skilled in the art may make various modifications to the disclosed invention without affecting the spirit and scope thereof. These include substitutions which perform substantially the same function in substantially the same way to perform substantially the same result. It also includes the addition of superfluous material or components to the invention. It is understood that the scope of the invention is defined by the following claims:

I claim:

1. An improved sports bottle comprising an integrally formed plastic liquid container, said container having a base end surface, a neck end surface and a cylindrical side surface, said cylindrical side surface situated between said neck end surface and said base end surface, said container having an inside and an outside, said cylindrical side surface having an outside diameter, said container having an integrally formed threaded neck, said threaded neck having a first attached end and a second fill end, said threaded neck having a maximum external diameter smaller than said outside diameter, said neck end surface situated between said cylindrical side surface and said first attached end of said neck, said neck end surface essentially parallel to said base end surface of said container, said fill end of said neck communicating with said inside of said bottle through said neck, said sports bottle including a threaded cap fitting said neck, wherein the improvement comprises:

(a) a supporting member having a hole, said supporting member mounted on said neck through said hole, said supporting member secured against vertical movement by said cap, said supporting member having an elongated mounting tab, said mounting tab having a fixed end integral with said supporting member at said neck end surface on the outside of said container, said elongated mounting tab also having a free end, said elongated mounting tab extending essentially parallel to and on said outside of said cylindrical side surface of said container in a direction from said neck end surface of said container to said base end surface of said container, said free end not extending beyond said base end surface of said container.

2. An improved sports bottle including a liquid container, said container having a base end surface, a neck end surface and a cylindrical side surface, said cylindrical side surface situated between said neck end surface and said base end surface, said container having an inside and an outside, said container having an integrally formed externally threaded neck, said threaded neck having a first attached end and a second fill end, said threaded neck having a maximum external diameter smaller than said outside diameter, said neck end surface situated between said cylindrical side surface and said first attached end of said neck, said neck end surface essentially parallel to said base end surface of said container, said fill end of said neck communicating with said inside of said bottle through said neck, said threaded neck having an external thread diameter and a base diameter, said external thread diameter of said neck greater than said base diameter of said neck, said sports bottle including an internally threaded cap fitting said neck, said cap having a lower circumferential edge, said cap having an external cap diameter greater than said external thread diameter, said sports bottle having a clearance between said container and said cap at said neck end surface when said cap is fully tightened on said bottle, wherein the improvement, a supporting device for said sports bottle, comprises:

(a) an annular retaining section having an upper bearing surface and a lower surface and a thickness less than or about equal to said clearance, said annular retaining section having a fixed inside diameter larger than said base diameter, said inside diameter smaller than said external diameter of said cap, said annular retaining section having an external diameter greater than said external diameter of said cap, said annular retaining section demountably positioned on said neck, said neck protruding through said annular retaining section, said lower surface closer to said container neck end surface than said upper bearing surface, said retaining section secureable in said mounted position by said cap, said cap threadably mounted onto said neck, said threadably mounted cap captivating said mounted retaining section between said circumferential edge of said cap and said neck end surface of said container, said lower circumferential edge of said cap bearing on said upper bearing surface of said retaining section for preventing movement of said retaining section above said cap; and (b) a structural member having a fixed end, said fixed end integral with said retaining section; and (c) means for attaching said structural member to a support.

3. An improved sports bottle as claimed in claim 2 wherein said structural member comprises:

(a) an extension section having a first end and a second end, said first end of said extension section integral with said retaining section, said extension section directed radially outward from said retaining section to said second end of said extension section at a radius about equal to an outer radius of said container; and (b) an elongated mounting tab integral with said extension section at said second end of said extension section, said elongated mounting tab extending downward from said retaining section in a direction essentially parallel to an axis perpendicular to the plane of said retaining section, said axis passing through the center of said annular retaining section, said elongated mounting tab located at a distance about equal to said outer radius of said container from said axis, so that when said neck of said sports bottle is placed through said hole in said supporting device to protrude through said up side and is secured in place by said cap, said mounting tab extends down the outside of said container.

4. An improved sports bottle as claimed in claim 3 wherein said fixed inside diameter of said annular retaining section is less than said external thread diameter of said neck.

5. An improved sports bottle including a liquid container, said container having a base end surface, a neck end surface and a cylindrical side surface, said cylindrical side surface situated between said neck end surface and said base end surface, said container having an inside and an outside, said container having an integrally formed externally threaded neck, said threaded neck having a first attached end and a second fill end, said threaded neck having a maximum external diameter smaller than said outside diameter, said neck end surface situated between said cylindrical side surface and said first attached end of said neck, said neck end surface essentially parallel to said base end surface of said container, said fill end of said neck communicating with said inside of said bottle through said neck, said threaded neck having an external thread diameter and a base diameter, said external thread diameter of said neck greater than said base diameter of said neck, said sports bottle including an internally threaded cap fitting said neck, said cap having a lower circumferential edge, said cap having an external cap diameter greater than said external thread diameter, said sports bottle having a clearance between said container and said cap at said neck end surface when said cap is fully tightened on said bottle, wherein the improvement, a supporting device for said sports bottle, comprises:

(a) an annular retaining section having an upper bearing surface and a lower surface and a thickness less than or about equal to said clearance, said annular retaining section essentially lying in a plane, said annular retaining section having a fixed inside diameter larger than said base diameter, said inside diameter smaller than said external diameter of said cap, said annular retaining section having an external diameter greater than said external diameter of said cap, said annular retaining section demountably positioned on said neck, said neck protruding through said annular retaining section, said lower surface closer to said container neck end surface than said upper bearing surface, said retaining section secureable in said mounted position by said cap, said cap threadably mounted onto said neck, said threadably mounted cap captivating said mounted retaining section between said circumferential edge of said cap and said neck end surface of said container, said lower circumferential edge of said cap bearing on said upper bearing surface of said retaining section for preventing movement of said retaining section above said cap; and (b) an extension section having a first end and a second end, said first end of said extension section integral with said retaining section, said extension section directed radially outward from said retaining section to said second end of said extension section at a radius about equal to an outer radius of said container; and (c) an elongated mounting tab integral with said extension section at said second end of said extension section, said elongated mounting tab extending downward from said retaining section in a direction essentially parallel to an axis perpendicular to said plane of said retaining section, said axis passing through the center of said annular retaining section, said elongated mounting tab located at a distance about equal to said outer radius of said container from said axis; and (d) a spacer integral with said elongated mounting tab near said second end of said extension section, said spacer located between said elongated mounting tab and said side surface of said container, said spacer bearing on said side of said container so that said elongated mounting tab is positioned away from said side of said container.

* * * * *